United States Patent
Choi (10) Patent No.: US 8,493,428 B2
(45) Date of Patent: Jul. 23, 2013

(54) APPARATUS AND METHOD FOR PROVIDING VIDEO TELEPHONY SERVICE IN MOBILE COMMUNICATION TERMINAL

(75) Inventor: Woo-Young Choi, Incheon (KR)

(73) Assignee: Samsung Electronics Ltd., Co., Suwon-si (KR)

( * ) Notice: Subject to any disclaimer, the term of this patent is extended or adjusted under 35 U.S.C. 154(b) by 898 days.

(21) Appl. No.: 12/608,742

(22) Filed: Oct. 29, 2009

(65) Prior Publication Data

US 2010/0118110 A1    May 13, 2010

(30) Foreign Application Priority Data

Nov. 7, 2008  (KR) .................. 10-2008-0110234

(51) Int. Cl.
*H04N 7/14*  (2006.01)
(52) U.S. Cl.
CPC .................... *H04N 7/141* (2013.01)
USPC ....................................... 348/14.02

(58) Field of Classification Search
USPC ............................ 348/14.02, 14.01
See application file for complete search history.

(56) References Cited

U.S. PATENT DOCUMENTS

| 2008/0266377 | A1* | 10/2008 | Kim et al. ............... 348/14.02 |
| 2008/0303888 | A1* | 12/2008 | Hansson ................. 348/14.02 |
| 2009/0051754 | A1* | 2/2009 | Levent-Levi et al. ....... 348/14.02 |
| 2011/0216708 | A1* | 9/2011 | Ling ....................... 348/14.02 |

* cited by examiner

*Primary Examiner* — Stella Woo
(74) *Attorney, Agent, or Firm* — Jefferson IP Law, LLP (57) ABSTRACT

An apparatus and a method for providing a video telephony service in a mobile communication terminal are provided. The apparatus for providing the video telephony service in the mobile communication terminal includes a controlling unit for receiving preferred video format information from a peer mobile communication terminal during a signaling procedure with the peer mobile communication terminal for the video telephony service and for determining a video format to use in the video telephony service using the received preferred video format, and a video codec for encoding and decoding video data that is transmitted to and received from the peer mobile communication terminal, using the determined video format.

16 Claims, 5 Drawing Sheets

APPARATUS AND METHOD FOR PROVIDING VIDEO TELEPHONY SERVICE IN MOBILE COMMUNICATION TERMINAL

PRIORITY

This application claims the benefit under 35 U.S.C. §119 (a) of a Korean patent application filed in the Korean Intellectual Property Office on Nov. 7, 2008 and assigned Serial No. 10-2008-0110234, the entire disclosure of which is hereby incorporated by reference.

BACKGROUND OF THE INVENTION

1. Field of the Invention

The present invention relates to an apparatus and a method for providing a video telephony service. More particularly, the present invention relates to the provision of a high quality video telephony service by supporting multiple video formats for a video telephony service between mobile communication terminals.

2. Description of the Related Art

A Video Telephony (VT) service in a current third generation (3G) network follows the 3G-324M international standard specification. The maximum capacities of video, voice and data, recommended in the international standard specification, depend on the capacity of a data transmission apparatus. However, the maximum capacity of a Circuit Switched Domain (CSD) network for a video telephony service in the 3G network is 64 kilo bits per second (64 kbps).

That is, the video data rate, voice data rate and rate for data communication in the CSD network are limited to 64 kbps each. Normally, the video data rate is 48~52 kbps, the voice data rate is 4~12 kbps, and the rate for date communication is 2 kbps.

A video telephony service under the 3G-324M protocol is designed for data transmission between mobile communication terminals. Accordingly, the video telephony service by the 3G-324M protocol should guarantee an inter-compatibility between service providers.

Therefore, the video telephony service under the 3G-324M protocol is adopted as the standard specification and a video telephony service under the 3G-324M protocol is used by most service providers for a simple and precise video telephony service between users.

Because the video telephony service by the 3G-324M protocol is for data transmission between mobile communication terminals, the video telephony service by the 3G-324M protocol has a limited resource capacity in maximum transmission and reception and the service providers have a limitation in an operation of the 3G network.

End users usually receive a poor quality image during a video telephony service due to the limitations listed above so that the video telephony service is unpopular. Especially, due to the limited communication capacity, a Quarter Common Intermediate Format (QCIF) (176*144 resolution) is used as a formulaic video format in all 3G mobile communication terminals.

However, the small sized QCIF format cannot provide sufficient quality to users having mobile communication terminals with performance enhancements such as larger Liquid Crystal Displays (LCD) or faster processors. Also, the video telephony service under the 3G-324M protocol uses common standard video formats to guarantee inter-compatibility between the service providers. However, appropriate video formats corresponding to the physical performance enhancement in the mobile communication terminal are not provided.

When an encoding procedure is used in the video telephony service, original video data is damaged and it is impossible to decode encoded video data equivalent to the original video data. Thus, users receive a poor quality video telephony service.

When a peer mobile communication terminal does not have an LCD panel which can not satisfy a QCIF resolution, an image processing for adjusting the QCIF resolution is required. According to the adjusting of the QCIF resolution, the decoded video data is damaged again.

Therefore, there is a need to provide an apparatus and a method employing an enhancement in the 3G-324M protocol, which only supports video data with low resolution, to address the limitations of the video telephony service.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for providing a high quality video by supporting multiple video formats in a video telephony service of a mobile communication terminal.

Another aspect of the present invention is to provide an apparatus and a method for providing users a high quality video telephony service by supporting multiple video formats for video telephony service between mobile communication terminals using 3G-324M protocol in a mobile communication terminal.

Yet another aspect of the present invention is to provide an apparatus and a method for providing an optimal video service for a screen resolution in a mobile communication terminal by exchanging preferred video format information, supported by the mobile communication terminal, by using protocol messages.

In accordance with an aspect of the present invention, a method for providing a video telephony service in a mobile communication terminal is provided. The method includes receiving preferred video format information from a peer mobile communication terminal during a signaling procedure with the peer mobile communication terminal and determining a video format to use in the video telephony service using the received preferred video format, and transmitting and receiving video data with the peer mobile communication terminal using the determined video format.

In accordance with another aspect of the present invention, an apparatus for providing a video telephony service in a mobile communication terminal is provided. The apparatus includes a controlling unit for receiving preferred video format information from a peer mobile communication terminal during a signaling procedure with the peer mobile communication terminal and for determining a video format to use in the video telephony service using the received preferred video format, and a video codec for encoding and decoding video data that is transmitted to and received from the peer mobile communication terminal, using the determined video format.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereafter, an exemplary apparatus and method for providing users a high quality video telephony service by supporting multiple video formats for a video telephony service between mobile communication terminals using the 3G-324M protocol in a mobile communication terminal will be described.

In a video telephony service, during a video phone call, two mobile communication terminals exchange a video stream through a packet switched network or through a circuit switched network.

Both mobile communication terminals commonly control the video stream using the H.245 protocol. Herein, the H.245 protocol is used to negotiate a performance and a channel between mobile communication terminals by sending and receiving control messages. The control messages are used to exchange capability information, to establish a logical channel, and to determine a preferred mode, a flow control, a normal command and a normal indication between the mobile communication terminals.

Also, the control messages may be used to establish a master/slave relationship, and to exchange capability information, logical channel signaling information, mode control information and delay information.

Also, the H.245 protocol is used to perform a negotiation for inter-compatibility and a control for Quality of Service (QoS) between mobile communication terminals. Examples of the control for QoS are an adjusting of a frame/bit rate, an adjusting of a size of a video, a fast update request, and so on.

After the exchange and negotiation of protocols process, both mobile communication terminals perform the video telephony service by transmitting and receiving video data (motion image data and voice data) according to a determined data format.

Figure 1:
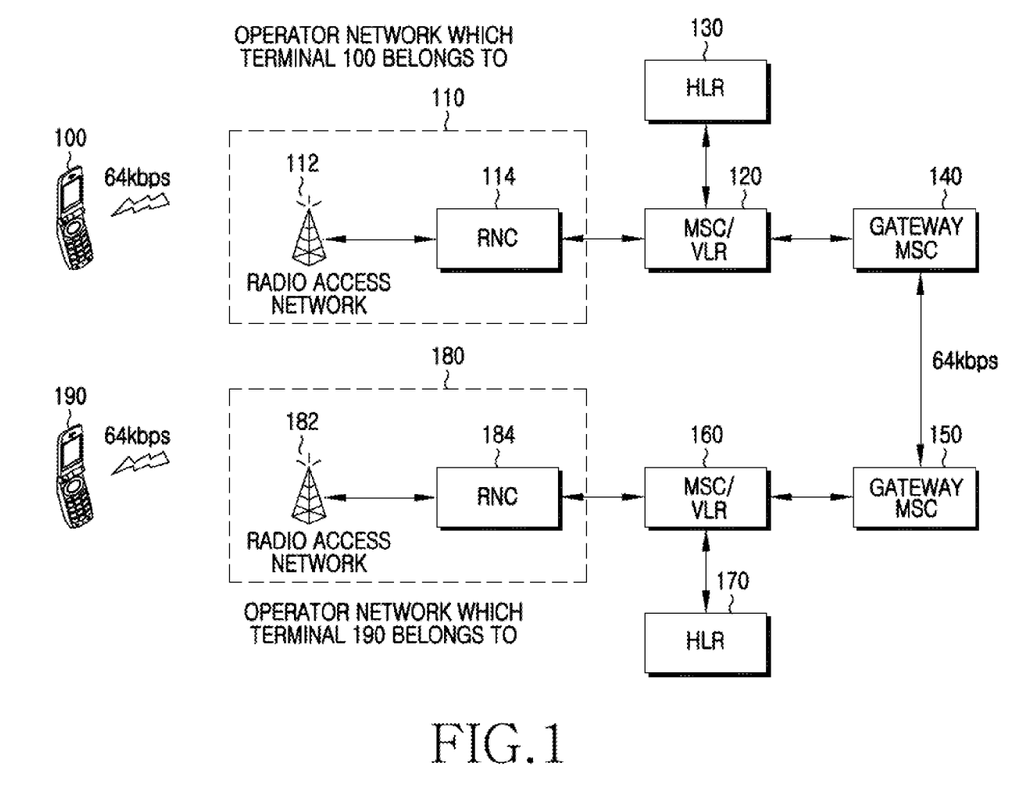
FIG. 1 illustrates a block diagram of a mobile communication system according to an exemplary embodiment of the present invention.

FIG. 1 illustrates a block diagram for a mobile communication system according to an exemplary embodiment of the present invention.

Referring to FIG. 1, the mobile communication system according to the present invention includes a first mobile communication terminal 100, a second mobile communication terminal 190, a first Radio Access Network (RAN) 110, a second RAN 180, a first Mobile Switching Center (MSC)/Visitor Location Register (VLR) 120, a second MSC/VLR 160, a first Home Location Register (HLR) 130, a second HLR 170, a first gateway MSC 140, and a second gateway MSC 150.

The first mobile communication terminal 100 performs a video phone call and a voice phone call with the second mobile communication terminal 190 through the first and second RANs 110, 180. In the following description, the first mobile communication terminal 100 will initiate a call (i.e., be a call originator) and the second mobile communication terminal 190 will receive the call (i.e., be a call terminator). The call originator 100 and the call terminator 190 both use the H.324M protocol.

The first and second mobile communication terminals 100, 190 provide a high quality video telephony service by supporting multiple video formats using the H.324M protocol according to an exemplary embodiment of the present invention.

The first and second RANs 110, 180 provide an infra system for guaranteeing mobility of the first and second mobile communication terminals 100, 190. The first and second RANs 110, 180 perform a handoff management and a radio resource management for the first and second mobile communication terminals 100, 190. Herein, the first and second RANs 110, 180 respectively comprise a first Node B 112 and a second Node B 182 and a first Radio Network Controller (RNC) 114, and a second RNC 184.

Each MSC of the first and second MSCs/VLRs 120, 160 performs a processing for basic and supplementary service, originated and terminated calls of subscribers, a location registration, a handoff and an interworking to other networks. Each VLR of the first and second MSCs/VLRs 120, 160 manages location information of the subscribers. The first and second HLRs 130, 170 store profile information of the subscribers and manage locations of the first and second mobile communication terminals 100, 190.

Herein, when the call originator 100 attempts to originate a call to the call terminator 190, which belongs to another service provider, an originating call passes through the first and second RANs 110, 180, the first and second MSCs/VLRs 120, 160, the first and second HLRs 130, 170 and the first and second gateway MSCs 140, 150. A connection between service providers is made through the first and second gateway MSCs 140, 150.

Figure 2:
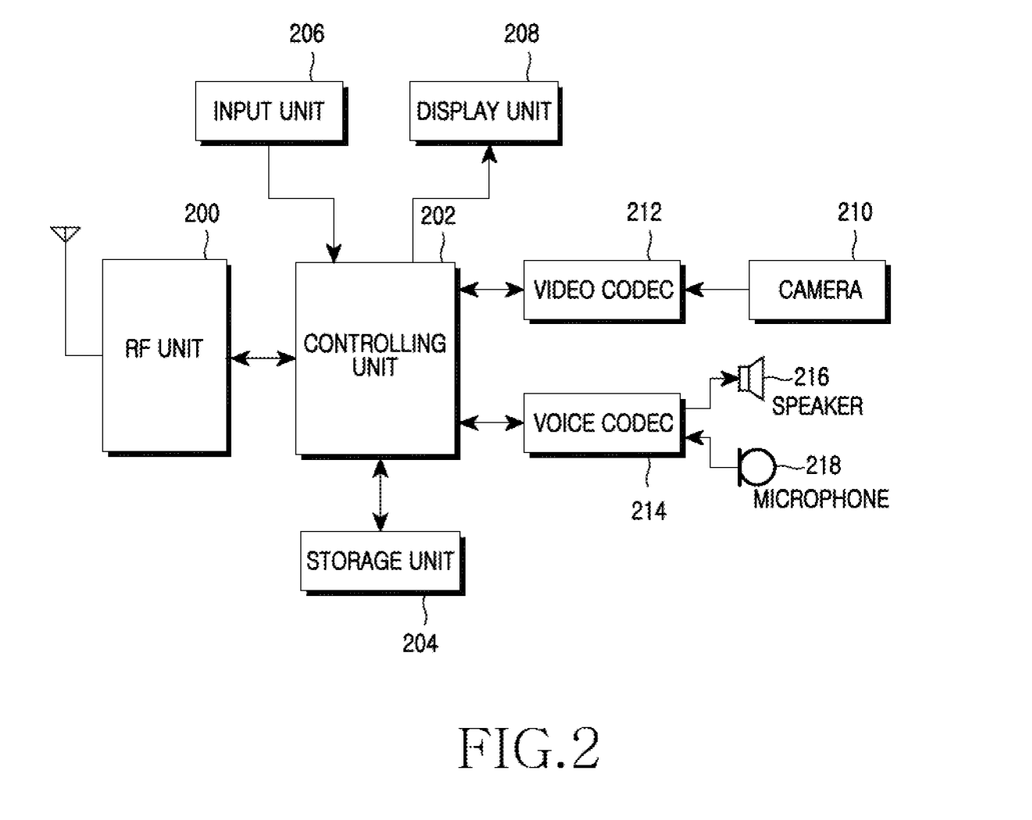
FIG. 2 illustrates a block diagram of a mobile communication terminal according to an exemplary embodiment of the present invention.

FIG. 2 illustrates a block diagram of a mobile communication terminal according to an exemplary embodiment of the present invention.

In the following description, the mobile communication terminal refers to a cellular phone, a Personal Communication System (PCS) terminal, a Personal Data Assistant (PDA), an International Mobile Telecommunications-2000 (IMT-2000) terminal, a fourth generation (4G) broadband terminal and other terminal types. The following description will be made referring to general configurations of the above-described terminals.

Referring to FIG. 2, the mobile communication terminal includes a Radio Frequency (RF) unit 200, a controlling unit (e.g., a MicroProcessor Unit (MPU)) 202, a storage unit 204, an input unit 206, a display unit 208, a camera 210, a video codec 212, a voice codec 214, a speaker 216 and a microphone 218.

The RF unit 200 down-converts an RF signal received through an antenna to provide the down-converted signal to the controlling unit 202 and up-converts a baseband signal from the controlling unit 202 to transmit the up-converted signal through the antenna.

The controlling unit 202 controls the overall operations of the mobile communication terminal. For instance, it performs processing and controlling for audio communication and data communication. In addition, the controlling unit 202 controls a function of providing users a high quality video telephony service by supporting multiple video formats according to exemplary embodiments of the present invention. Explanation of conventional operations for the processing part and the controlling part of the controlling unit 202 will be omitted in the following description for sake of convenience.

The storage unit 204 stores micro-codes of programs for use by the controlling unit 202 to process control and store various reference data. The storage unit 204 especially stores programs for providing users a high quality video telephony service by supporting multiple video formats according to an exemplary embodiment of the present invention. Also, the storage unit 204 stores temporary data generated during program operations.

The input unit 206 consists of a plurality of function keys including number keys for the numerals 0-9, a Menu key, a Cancel (Erase) key, an OK key, a Talk key, an End key, an internet connection key, and navigational (or directional) keys (▲/▼/◀/▶). When a user presses a key, its corresponding input signal is sent to the controlling unit 202.

The display unit 208 displays status information during the operations of the mobile communication terminal, characters of limited numerals and various moving images and still images, etc. The display unit 208 may by a color Liquid Crystal Display (LCD).

The camera 210 includes a camera sensor and a signal processing unit. The camera sensor converts optical signals detected during recording to an analog video signal and the signal processing unit converts the analog video signal provided from the camera sensor to digital video data.

The video codec 212 encodes the digital video data provided from the camera 210 to provide encoded digital video data to the controlling unit 202 or decodes video data provided from the controlling unit 202 to output to the display unit 208 and the speaker 216.

The video codec 212 operates according to a video format corresponding to a resolution negotiated with a peer mobile communication terminal during signaling to connect a video phone call according to an exemplary embodiment of the present invention.

The voice codec 214 encodes analog voice signals received through the microphone 218 into digital data and provides the digital data to the controlling unit 202. Also, the voice codec 214 decodes digital data provided from the controlling unit 202 to an analog voice signal and outputs the analog voice signal through the speaker 216.

Figure 3:
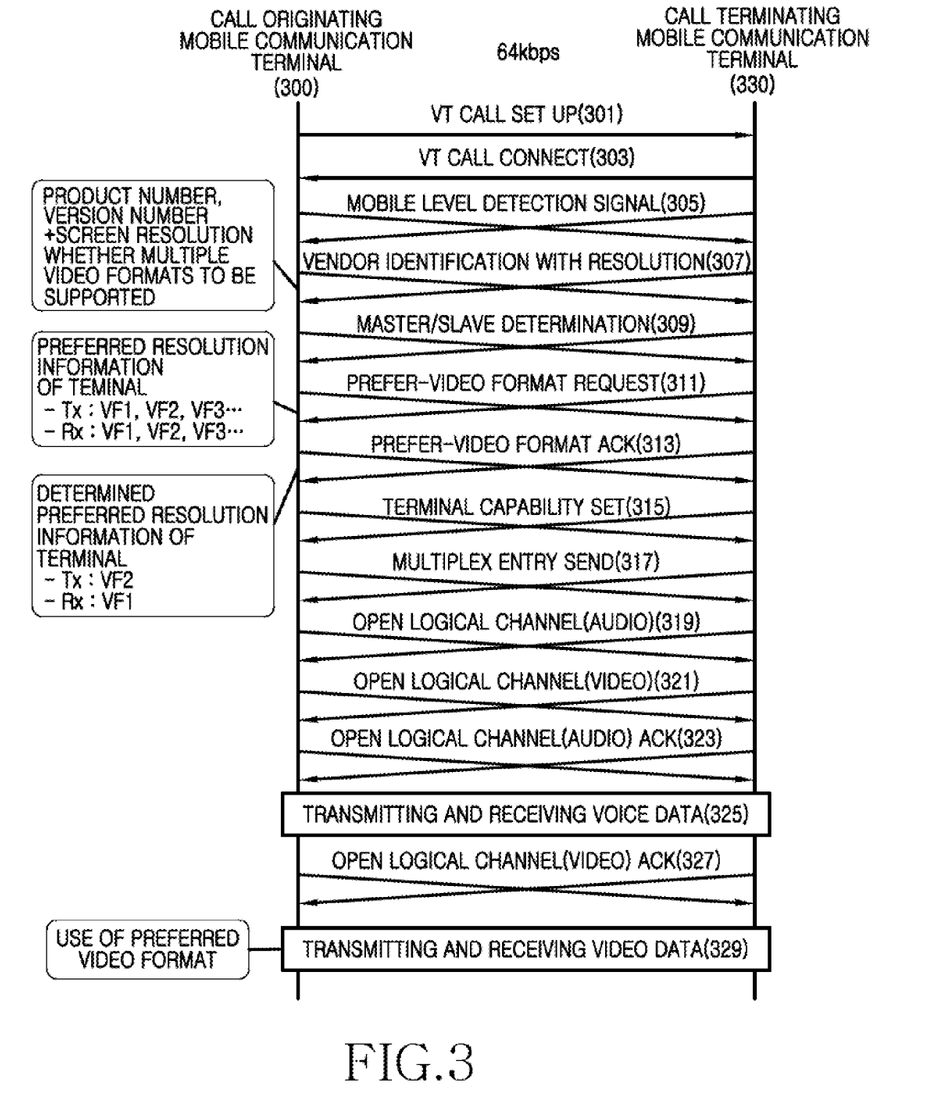
FIG. 3 illustrates a signaling flowchart for a video telephony service between mobile communication terminals supporting multiple video formats according to an exemplary embodiment of the present invention.

FIG. 3 illustrates a signaling flowchart for a video telephony service between mobile communication terminals supporting multiple video formats according to an exemplary embodiment of the present invention.

Referring to FIG. 3, to start a video phone call, an originating mobile communication terminal 300 requests a call access to a terminating mobile communication terminal 330 by transmitting a Video Telephony (VT) call setup message in step 301. Hereafter, the terminating mobile communication terminal 330 notifies of completion of the call access to the originating mobile communication terminal 300 by transmitting a VT call connect message in step 303.

After the call access is established, the originating mobile communication terminal 300 and the terminating mobile communication terminal 330 determine a moving level for mutual negotiation by transmitting and receiving a Mobile Level Detection Signal message using the H.245 protocol in step 305.

Hereafter, the originating mobile communication terminal 300 and the terminating mobile communication terminal 330 exchange terminal identifier information by transmitting and receiving a Vender Identification with Resolution message in step 307.

Herein, the terminal identifier information exchanged may include a product number and a version number. Furthermore, the terminal identifier information may include screen resolution information and information which indicates whether multiple video formats are supported according to an exemplary embodiment of the present invention.

Herein, the originating mobile communication terminal 300 and the terminating mobile communication terminal 330 may determine whether the peer mobile communication terminal supports multiple resolution videos by exchanging information which indicates whether multiple video formats are supported.

Hereafter, the originating mobile communication terminal 300 and the terminating mobile communication terminal 330 determine a master and a slave for communication by transmitting and receiving a Master/Slave Determination message in step 309. In this manner, a mainstream for authorizing logical channel setup is to be determined by determining the master and the slave for communication.

Hereafter, the originating mobile communication terminal 300 and the terminating mobile communication terminal 330 exchange preferred screen resolution information by transmitting and receiving a Prefer-Video Format Request message including preferred video format information in step 311.

Herein, the preferred video format information may be configured as described in Table 1 below.

TABLE 1

| | | Priority Number | Determination Number |
|---|---|---|---|
| Preferred Video Format | Tx | VF0 | QCIF = 176 × 144 |
| | | VF1 | CIF = 352 × 288 |

TABLE 1-continued

|  |  | Priority Number | Determination Number |
|---|---|---|---|
| Information |  | VF2 | ... |
|  |  | ... | ... |
|  | Rx | VF0 | CIF = 352 × 288 |
|  |  | VF1 | Free Scale = 240 × 212 |
|  |  | VF2 | QCIF = 176 × 144 |
|  |  | ... | ... |
|  |  | VFn | Scale = 000x000 |

In Table 1, the preferred video format information may indicate referred video formats for transmission (TX) and reception (RX) and corresponding screen resolution and may indicate priority for the preferred video format information.

Hereafter, the originating mobile communication terminal 300 and the terminating mobile communication terminal 330 determine a preferred resolution from resolution information provided by the peer mobile communication terminal. The originating mobile communication terminal 300 and the terminating mobile communication terminal 330 determine a resolution which will be used in transmission and reception by transmitting and receiving a Prefer-Video Format Ack message and by exchanging the preferred resolution information determined by the originating mobile communication terminal 300 and the terminating mobile communication terminal 330 in step 313.

In step 315, the originating mobile communication terminal 300 and the terminating mobile communication terminal 330 exchange capability information by transmitting and receiving a Terminal Capability Set message. Herein, the capability information may include codec information for encoding/decoding video and voice data.

In step 317, the originating mobile communication terminal 300 and the terminating mobile communication terminal 330 exchange multiplex table entries by transmitting and receiving a Multiplex Entry Send message.

In steps 319 and 321, the originating mobile communication terminal 300 and the terminating mobile communication terminal 330 generate a logical channel for transmitting video and audio data by transmitting and receiving an Open Logical channel.

In steps 323 and 327, the originating mobile communication terminal 300 and the terminating mobile communication terminal 330 notify of a generation completion of each logical channel by transmitting and receiving an Open Logical channel ACK message.

In this manner, when the logical channel for transmission of the audio data is generated by transmission and reception of the Open Logical Channel message and the Open Logical Channel ACK message, the originating mobile communication terminal 300 and the terminating mobile communication terminal 330 are able to transmit/receive the audio data in step 325.

Also, when the logical channel for transmission of the video data is generated by transmission and reception of the Open Logical Channel message and the Open Logical Channel ACK message, the originating mobile communication terminal 300 and the terminating mobile communication terminal 330 are able to transmit/receive the video data in step 329.

Herein, the video codec, which is according to the video format suitable for a negotiated screen resolution, is used for the video data transmission and reception.

Figure 4A:
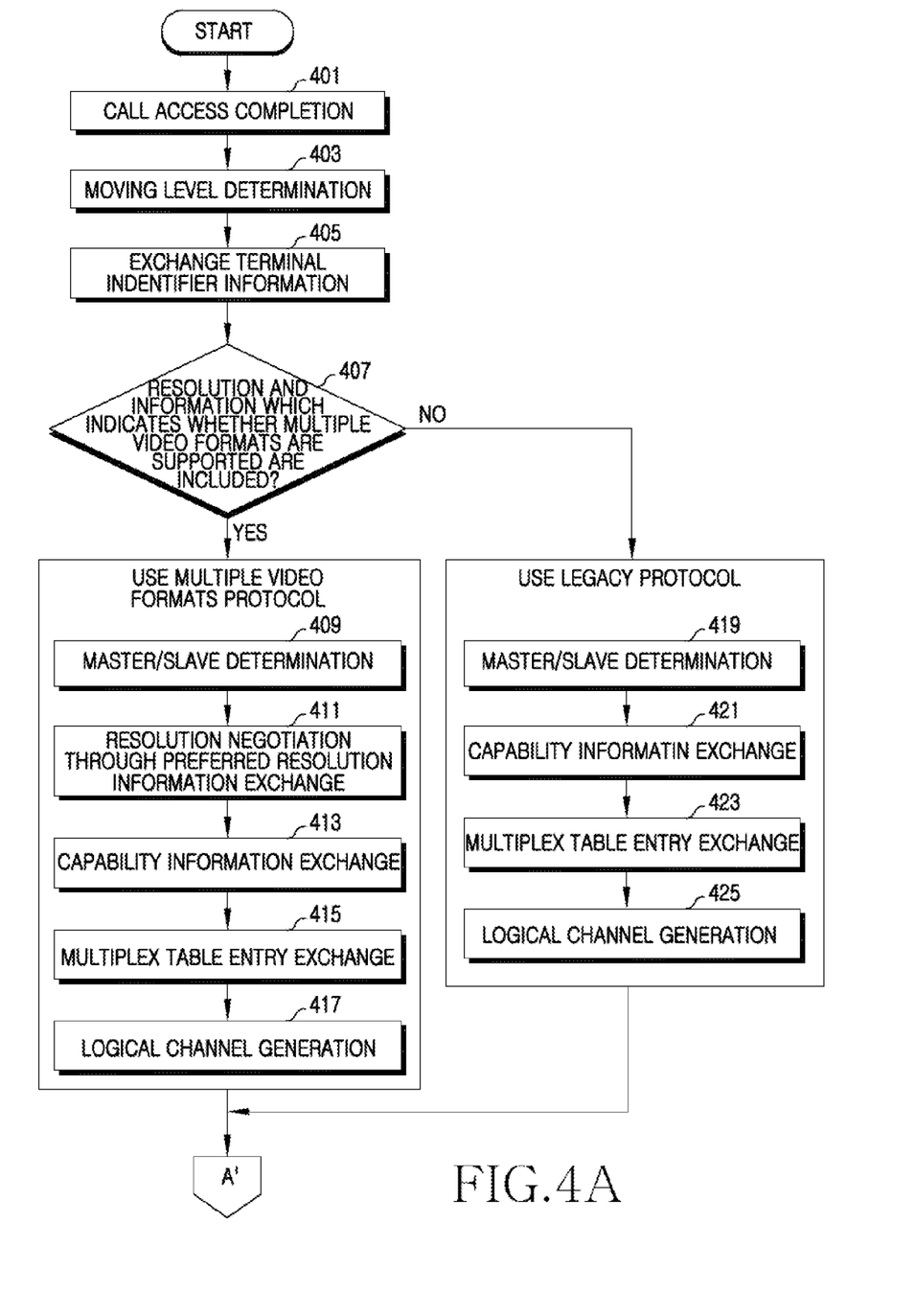
FIGS. 4A and 4B are flowcharts illustrating a method of a video telephony service according to an exemplary embodiment of the present invention.
Figure 4B:
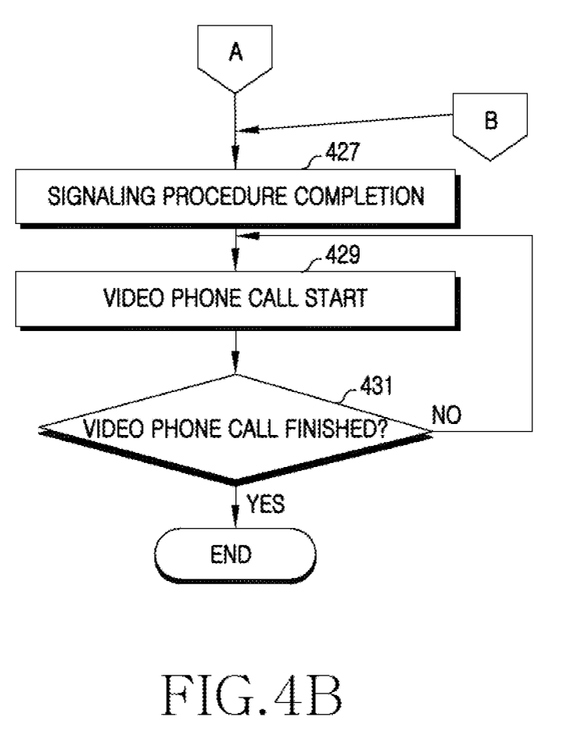

FIGS. 4A and 4B are flowcharts illustrating a method of a video telephony service according to an exemplary embodiment of the present invention.

Referring to FIG. 4A and FIG. 4B, a mobile communication terminal completes a video phone call access with a peer mobile communication terminal by transmitting and receiving a VT call Setup message and a VT call Connect message in step 401.

After completing the video phone call access, the mobile communication terminal determines a moving level for a mutual negotiation with the peer mobile communication terminal by exchanging a Mobile Level Detection Signal message of the H.245 protocol in step 403.

Hereafter, the mobile communication terminal provides terminal identifier information to the peer mobile communication terminal by exchanging a Vender Identification with Resolution message and obtains terminal identifier information of the peer mobile communication terminal in step 405.

Herein, the terminal identifier information may include a product number and a version number. The terminal identifier information may further include screen resolution information and information which indicates whether multiple video formats are supported according to an exemplary embodiment of the present invention.

Herein, the mobile communication terminal may determine whether the peer mobile communication terminal supports multiple screen resolution videos by exchanging the information which indicates whether multiple video formats are supported.

In step 407, the mobile communication terminal determines whether the terminal identifier information for the peer mobile communication terminal includes screen resolution information and information which indicates whether multiple video formats are supported.

When the terminal identifier information for the peer mobile communication terminal includes screen resolution information and information which indicates whether multiple video formats are supported, the mobile communication terminal performs a signaling procedure for a video telephony service by using a multiple video formats protocol proposed in an exemplary embodiment of the present invention in steps 409~417.

When the terminal identifier information for the peer mobile communication terminal does not include the screen resolution information and the information which indicates whether multiple video formats are supported, the mobile communication terminal performs a signaling procedure for a video telephony service by using a legacy protocol in steps 419~425.

In step 409, in the signaling procedure for the video telephony service using the multiple video formats protocol, the mobile communication terminal and the peer mobile communication terminal determine a master and a slave by exchanging a Master/Slave Determination message.

Hereafter, the mobile communication terminal provides preferred screen resolution information to the peer mobile communication terminal by exchanging a Prefer-Video Format Request message and obtains preferred screen resolution information of the peer mobile communication terminal in step 411

Also in step 411, the mobile communication terminal determines a preferred screen resolution from among the preferred screen resolution information of the peer mobile communication terminal.

The mobile communication terminal provides the determined preferred screen resolution information to the peer mobile communication terminal by exchanging a Prefer-Video Format ACK message and the mobile communication terminal obtains preferred screen resolution information which is determined by the peer mobile communication terminal from the peer communication terminal. In this manner, screen resolution information to be used in transmission and reception is negotiated.

In step 413, the mobile communication terminal and the peer mobile communication terminal exchange capability information by transmitting and receiving a Terminal Capability Set message. Herein, the capability information includes codec information for encoding/decoding video and voice data.

Hereafter, the mobile communication terminal and the peer mobile communication terminal exchange a multiplex table entry by transmitting and receiving a Multiplex Entry Send message in step 415.

In step 417, the mobile communication terminal and the peer mobile communication terminal generate a logical channel for transmitting each of video and audio data by exchanging an Open Logical channel message. Also, the mobile communication terminal and the peer mobile communication terminal notify of the completion of each logical channel generation by exchanging an Open Logical channel ACK message in step 417.

In this manner, when the logical channel is generated for transmission of the audio data and the video data by exchanging the Open Logical Channel message and the Open Logical Channel ACK message, the mobile communication terminal and the peer mobile communication terminal are able to transmit and receive the audio data and video data using each logical channel.

Herein, the video codec, which is used for the video data transmission and reception, operates according to the video format suitable for a negotiated screen resolution.

Referring again to step 407, if it is determined that the terminal identifier information for the peer mobile communication terminal does not include screen resolution information and information that indicates whether multiple video formats are supported or if the information indicates that multiple video formats are not supported, the mobile communication terminal and the peer mobile communication terminal determine a master and a slave for communication by exchanging a Master/Slave Determination message in step 419.

Hereafter, the mobile communication terminal and the peer mobile communication terminal exchange capability information by using a Terminal Capability Set message in step 421. Herein, the capability information includes codec information for encoding/decoding video and voice data.

In step 423, the mobile communication terminal and the peer mobile communication terminal exchange a multiplex table entry by exchanging a Multiplex Entry Send message.

Hereafter, the mobile communication terminal and the peer mobile communication terminal generate a logical channel for transmitting each of video and audio data by exchanging an Open Logical channel message and the mobile communication terminal and the peer mobile communication terminal notify of the completion of each logical channel generation by exchanging an Open Logical channel ACK message in step 425.

In this manner, when the logical channel is generated for transmission of audio data and video data by exchanging the Open Logical Channel message and the Open Logical Channel ACK message, the mobile communication terminal and the peer mobile communication terminal are able to transmit and receive audio data and video data using each logical channel.

Hereafter, the mobile communication terminal completes a signaling procedure for the video telephony service using a multiple video format protocol proposed in an exemplary embodiment of the present invention (i.e., from step 409 to 417) or by using a legacy protocol (i.e., from step 419 to 425) in step 427. Hereafter, the mobile communication terminal starts a video phone call in step 429.

In step 431, the mobile communication terminal determines whether the video phone call is finished. When the video phone call is not finished, the mobile communication terminal returns to step 429 and continues performing the remaining steps periodically. On the other hand, when the video phone call is finished, the mobile communication terminal finishes an algorithm according to the present invention.

In this manner, exemplary embodiments of the present invention support multiple sized video formats in order to enhance the video and the audio quality and support compatibility between mobile communication terminals by adding a corresponding protocol message in an H.245 control module.

In this manner, the mobile communication terminal is able to determine whether the peer mobile communication terminal supports multiple screen resolutions when connecting to the peer mobile communication terminal for the video telephony service.

When multiple screen resolutions are supported by the peer mobile communication terminal, the mobile communication terminal is able to determine which video format is preferred in the peer mobile communication terminal by exchanging protocol messages.

After negotiation of a video code for transmitting and receiving, the mobile communication terminal performs encoding according to the negotiated video format from the determined video codec.

Accordingly, the video quality in the video telephony service may be enhanced by supporting the multiple video formats. Thus, users may enjoy a higher quality video telephony service.

As set forth above, exemplary embodiments of the present invention provide users enhanced video quality by exchanging preferred video format information supported in the mobile communication terminal using protocol messages and by using video formats suitable for screen resolution of the mobile communication terminal for the video telephony service.

Exemplary embodiments of the present invention provide a mutual compatibility for any mobile communication terminal by providing protocol messages in the H.245 protocol.

However, the legacy protocol provides QCIF (176*144) as a default video format due to a limitation regarding the maximum communication capacity and screen size limitation of the mobile communication terminal.

When the multiple video formats proposed by exemplary embodiments of the present invention are supported, all the video formats recommended by ITU-T are possible to use in the mobile communication terminal and various selection and support for video size suitable for the screen of the mobile communication terminal are possible to use in the mobile communication terminal.

Also, because an optimal video format is transmitted to the peer mobile communication terminal, video quality deterioration is greatly reduced in the encoding and decoding process and video transmission delay is reduced because there is no need for image reprocessing. In this manner, exemplary embodiments of the present invention have an advantage in providing an optimal video telephony service.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a video telephony service in a mobile communication terminal, the method comprising:
   receiving preferred video format information from a peer mobile communication terminal during a signaling procedure with the peer mobile communication terminal;
   determining a video format to use in the video telephony service using the received preferred video format; and
   transmitting and receiving video data with the peer mobile communication terminal using the determined video format.

2. The method of claim 1, further comprising:
   completing a call access with the peer communication terminal;
   receiving identifier information from the peer communication terminal; and
   determining whether information for supporting multiple video formats exists in the identifier information,
   wherein the step of receiving the preferred video format information from the peer communication terminal is performed when it is determined that information of whether multiple video formats are supported in the identifier information exists.

3. The method of claim 2, wherein the identifier information includes at least one of a product number, a version number, a screen resolution and information of whether multiple video formats are supported in the peer mobile communication terminal.

4. The method of claim 2, further comprising determining a master terminal and a slave terminal by exchanging a Master/Slave Determination message with the peer mobile communication terminal.

5. The method of claim 2, further comprising exchanging a multiplex table with the peer mobile communication terminal.

6. The method of claim 2, further comprising, when it is determined that information of whether multiple video formats are supported in the identifier information does not exist:
   determining a master terminal and a slave terminal by exchanging a Master/Slave Determination message with the peer mobile communication terminal;
   receiving capability information from the peer communication terminal;
   exchanging a multiplex table with the peer mobile communication terminal; and
   generating a logical channel for transmitting audio data and video data with the peer communication terminal.

7. The method of claim 1, further comprising:
   after determining the video format to use in the video telephony service, receiving capability information from the peer communication terminal; and
   generating a logical channel for transmitting audio data and video data with the peer communication terminal.

8. The method of claim 1, further comprising determining a moving level for a mutual negotiation with the peer mobile communication terminal.

9. An apparatus for providing a video telephony service in a mobile communication terminal, the apparatus comprising:
   a controlling unit for receiving preferred video format information from a peer mobile communication terminal during a signaling procedure with the peer mobile communication terminal and for determining a video format to use in the video telephony service using the received preferred video format; and,
   a video codec for encoding and decoding video data that is transmitted to and received from the peer mobile communication terminal, using the determined video format.

10. The apparatus of claim 9, wherein the controlling unit, after completing a call access with the peer communication terminal, receives identifier information from the peer communication terminal, determines whether information for supporting multiple video formats exists in the identifier information and receives preferred video format information from the peer communication terminal when it is determined that information for supporting multiple video formats exists in the identifier information.

11. The apparatus of claim 10, wherein the identifier information includes at least one of a product number, a version number, a screen resolution and information of whether multiple video formats are supported in the peer mobile communication terminal.

12. The apparatus of claim 10, wherein the controlling unit determines a master terminal and a slave terminal by exchanging a Master/Slave Determination message with the peer mobile communication terminal.

13. The apparatus of claim 10, wherein the controlling unit exchanges a multiplex table with the peer mobile communication terminal.

14. The apparatus of claim 10, wherein the controlling unit, when it is determined that information of whether multiple video formats are supported in the identifier information does not exist:
   determines a master terminal and a slave terminal by exchanging a Master/Slave Determination message with the peer mobile communication terminal;
   receives capability information from the peer communication terminal;
   exchanges a multiplex table with the peer mobile communication terminal; and
   generates a logical channel for transmitting audio data and video data with the peer communication terminal.

15. The apparatus of claim 9, wherein the controlling unit, after determining a video format to use in the video telephony service, receives capability information from the peer communication terminal and generates a logical channel for transmitting audio and video data with the peer communication terminal.

16. The apparatus of claim 9 wherein the controlling unit determines a moving level for a mutual negotiation with the peer mobile communication terminal.

* * * * *